No. 736,318. PATENTED AUG. 11, 1903.
B. R. VAN KIRK.
FOUR WHEEL SWING FULCRUM TRUCK.
APPLICATION FILED MAR. 21, 1903.
NO MODEL. 3 SHEETS—SHEET 2.
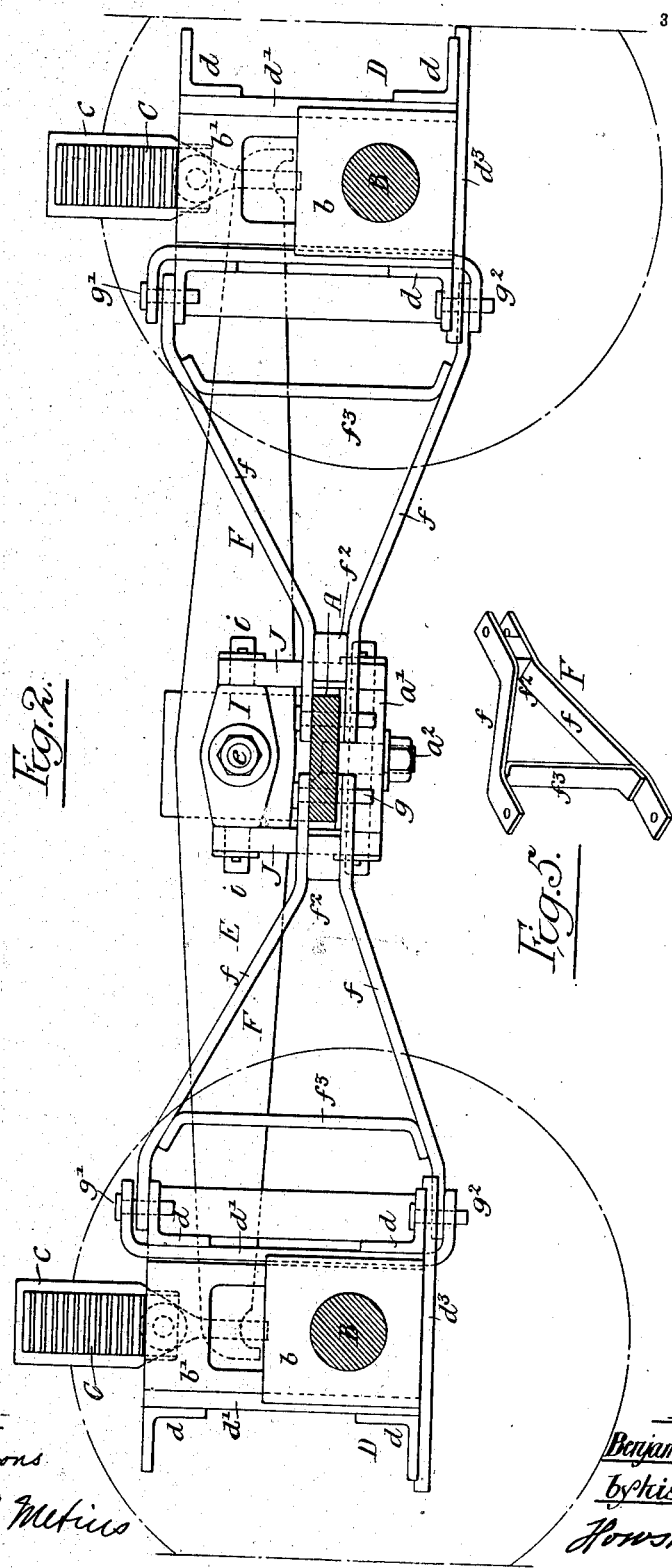

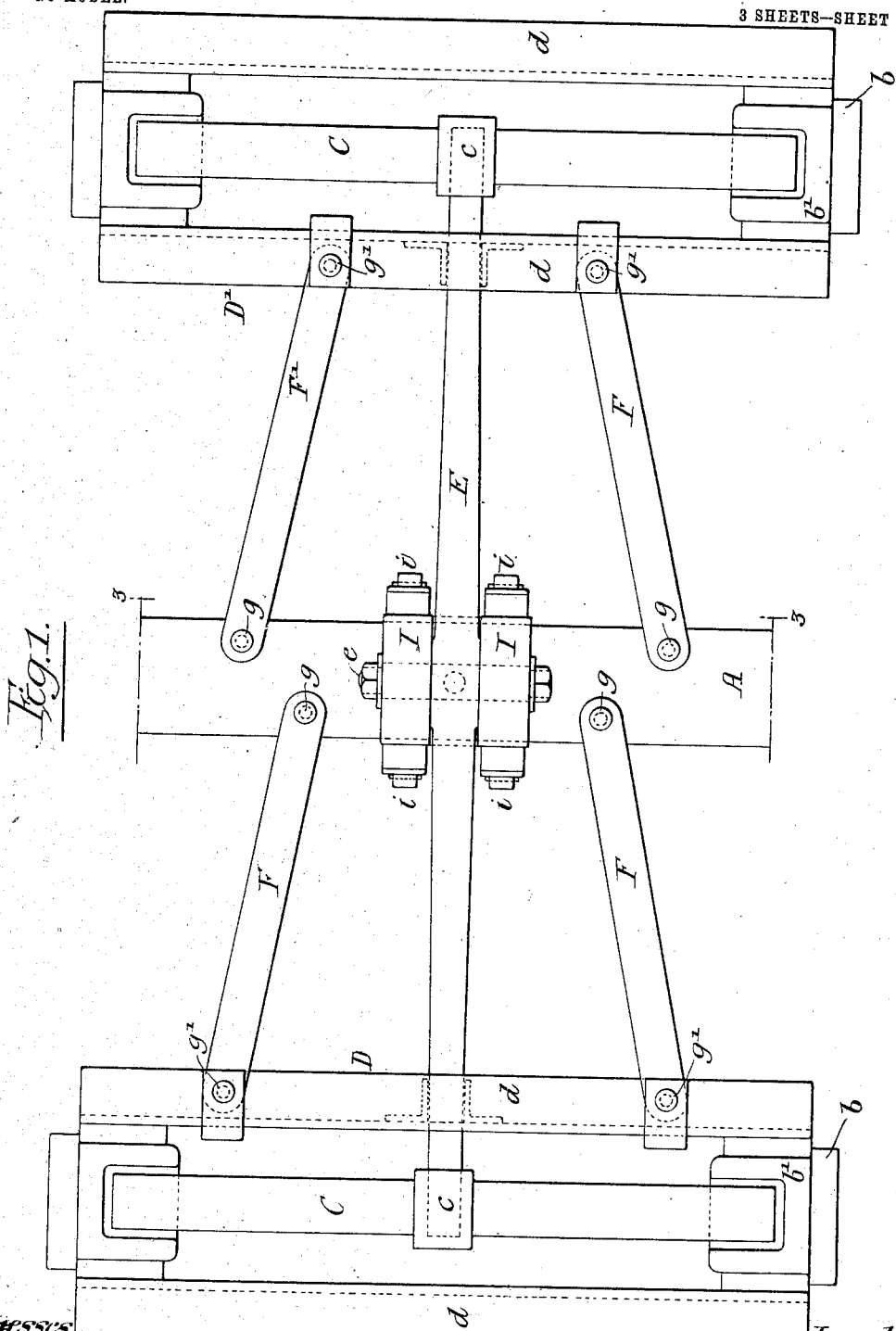

No. 736,318. Patented August 11, 1903.

UNITED STATES PATENT OFFICE.

BENJAMIN RUSSELL VAN KIRK, OF PHILADELPHIA, PENNSYLVANIA, ASSIGNOR TO BURNHAM, WILLIAMS & COMPANY, OF PHILADELPHIA, PENNSYLVANIA, A FIRM.

FOUR-WHEEL SWING-FULCRUM TRUCK.

SPECIFICATION forming part of Letters Patent No. 736,318, dated August 11, 1903.

Application filed March 21, 1903. Serial No. 148,907. (No model.)

*To all whom it may concern:*

Be it known that I, BENJAMIN RUSSELL VAN KIRK, a citizen of the United States, residing in Philadelphia, Pennsylvania, have invented certain Improvements in Four-Wheel Swing-Fulcrum Trucks, of which the following is a specification.

The object of my invention is to so construct a truck for use under railway-cars or locomotives that the axles as well as the truck will assume radial positions or positions approximately radial in passing around curves on the track, at the same time to so arrange the pivot of the beam that it will swing, as fully described hereinafter, reference being had to the accompanying drawings, in which—

Figure 4:
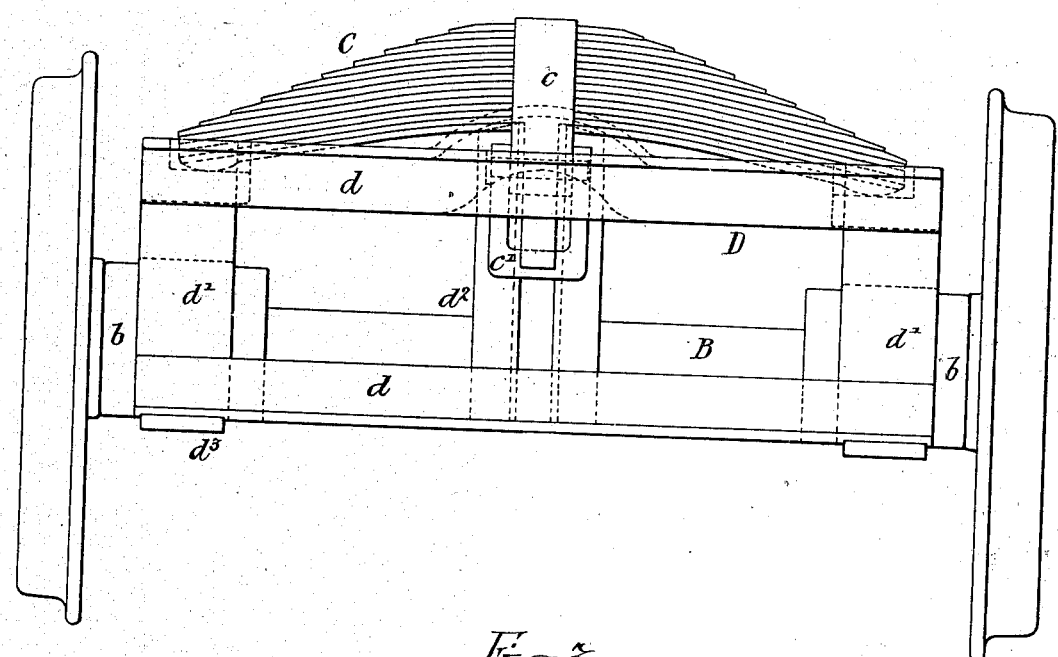
Figure 3:
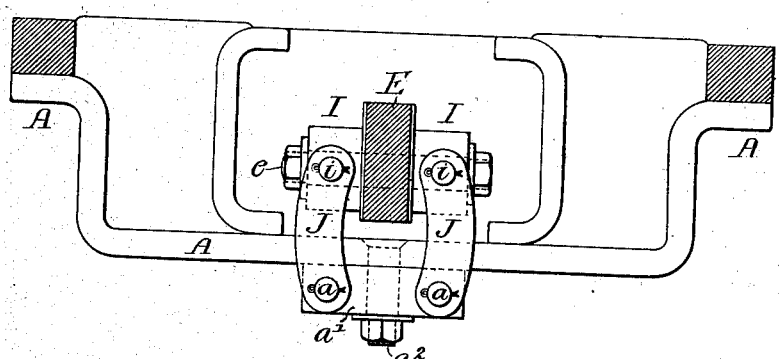
Figure 6:
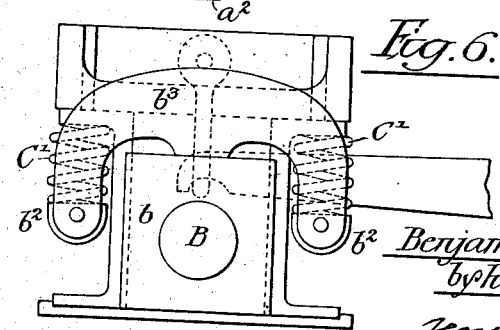

Figure 1 is a plan view of sufficient of a car-truck to illustrate my invention. Fig. 2 is a side view, partly in section, showing the wheels in dotted lines. Fig. 3 is a transverse sectional view on the line 3 3, Fig. 1. Fig. 4 is an end view of the truck. Fig. 5 is a view of one of the radius-bars, and Fig. 6 is a view of a modification of the spring construction.

Four-wheel car-trucks have been made in which the truck itself was so mounted that it would assume a radial position when passing around a curve, and trucks have been arranged to swing to one side of the center of the car or locomotive. Still even with this feature the wheels will bind more or less on the rails. By my invention, however, the truck not only swings, so as to assume a radial position, but the axles of the trucks also assume the radial position, so that the wheels properly take the curve.

Referring to the drawings, A is the fixed portion of the car or locomotive.

D D' are frames connected to the fixed frame A.

B B are axles mounted in boxes $b\,b$, of the ordinary type, carried by the frames D D'. These frames consist of transverse angle-bars $d\,d$, in the present instance connecting vertical members $d'\,d^2$ and base member $d^3$. Resting on the boxes B are bearing-blocks $b'$, having cavities for the reception of the spring C, as shown clearly in Fig. 4. The springs in the present instance extend from a box on one side to a box on the other side, and the strap $c$ of the spring is connected to a stirrup $c'$, which is shaped to receive the end of the beam E.

The frames D D' are connected to the cross-beam of the main frame A by radius-bars F F', which in the present instance are shaped as shown in Fig. 5. Each radius-bar is made in the form of an open frame having upper and lower members $f\,f'$, tied together by a block $f^2$ at one end and by a member $f^3$ at the opposite end. The radius-bars are coupled to the main frame A by means of pins $g$ and to each frame D by pins $g'\,g^2$.

The radius-bars are pivoted to the frames in the manner shown in Fig. 1. It will be noticed that the radius-bars converge in the same direction. The pivots of the bars F on the frame A are nearer the center than the pivots of the bars F', and the pivots of the bars F' on the frame D' are nearer the center than the pivots of the bars F on the frame D.

Owing to the convergence of the radius-bars F F', lateral movement of the frame A in respect to the frames D D', such as would be caused when an engine or car was entering upon or leaving a curve of the track, would result in one of the bars pushing and the other pulling upon its respective frame D or D', with the effect of swinging the same into a position radial in respect to the axis of the curve of the track.

The beam E, which supports the weight of the car through the medium of the springs and the axle-boxes, has two levers I I, hung to each side of it by means of a pivot-bolt $e$, and hung from the trunnions $i\,i$ of the levers I I, as shown in Fig. 3, are links J, which are in turn coupled to pins $a$, which pass through a swivel-block $a'$, secured by a bolt $a^2$ to the cross-beam of the main frame A, so that while the frames D D' of the truck can move laterally and assume a radial position the beam E can move bodily to one side or the other by means of the link, lever-couplings, and swivel-block. The beam, however, is free to rock on its pivot $e$, and thus equalizes the pressure on the two axles B B.

The frame shown in Fig. 3 of the drawings is designed as the main frame of a locomotive; but the type of main frame may vary according to the type of locomotive or car to which my invention is to be applied.

In some instances I may modify the spring construction and substitute for the transverse spring shown in Fig. 4 coiled springs. (Shown in Fig. 6.) These springs C' are mounted between the flanges of the cross-beams of the truck and blocks $b^2$, carried by a yoke $b^3$, resting on the box $b$. The beam E rests in a stirrup hung from a cross-bar on the frame.

In an application filed April 13, 1903, Serial No. 152,395, I have illustrated and claimed a single two-wheeled truck connected to a fixed frame by radius-bars and I have also illustrated and claimed in said application the equalizing-beam and its connection to the fixed frame.

I claim as my invention—

1. The combination of a main frame, two axle-frames, axles mounted thereon, and a pair of radius-bars connecting each axle-frame to the main frame, said radius-bars being pivoted to the main frame and to the axle-frames, substantially as described.

2. The combination of a fixed frame, two two-wheeled axle-frames, two pairs of bars connecting the axle-frames to the fixed frame, each pair of bars converging in the same direction, substantially as described.

3. The combination of a fixed frame, two axle-frames, two pairs of bars connecting the axle-frames to the fixed frame, each pair of bars converging in the same direction, and the points of connection of one pair being closer to the center of the fixed frame than those of the other pair, substantially as described.

4. The combination in a truck, of a main frame, two axle-frames, radius-bars connecting the axle-frames with a main frame, boxes in the axle-frames, axles mounted in the boxes, and an equalizing-beam connected to the main frame and springs interposed between the equalizing-beam and the boxes, substantially as described.

5. The combination of a main frame, axle-frames on each side of the main frame, a pair of radius-bars connecting the main frame with each axle-frame, two axles, bearings for the axles mounted in the axle-frames, a transverse spring on each axle-frame having its ends resting upon the opposite boxes, an equalizing-beam having its ends connected to the springs, and links coupling the said equalizing-beam at the center with the main frame, substantially as described.

6. The combination of a main frame, two axle-frames, bearings guided in the axle-frames, axles mounted in the bearings, springs resting upon the bearings, an equalizing-beam having its ends connected to the springs, levers pivoted on each side of the beam at the center, and four links coupling the said levers to pins on the main frame, so that the equalizing-beam can move laterally with the axle-frames, substantially as described.

In testimony whereof I have signed my name to this specification in the presence of two subscribing witnesses.

BENJAMIN RUSSELL VAN KIRK.

Witnesses:
WILL. A. BARR,
JOS. H. KLEIN.